United States Patent Office 3,296,896
Patented Jan. 10, 1967

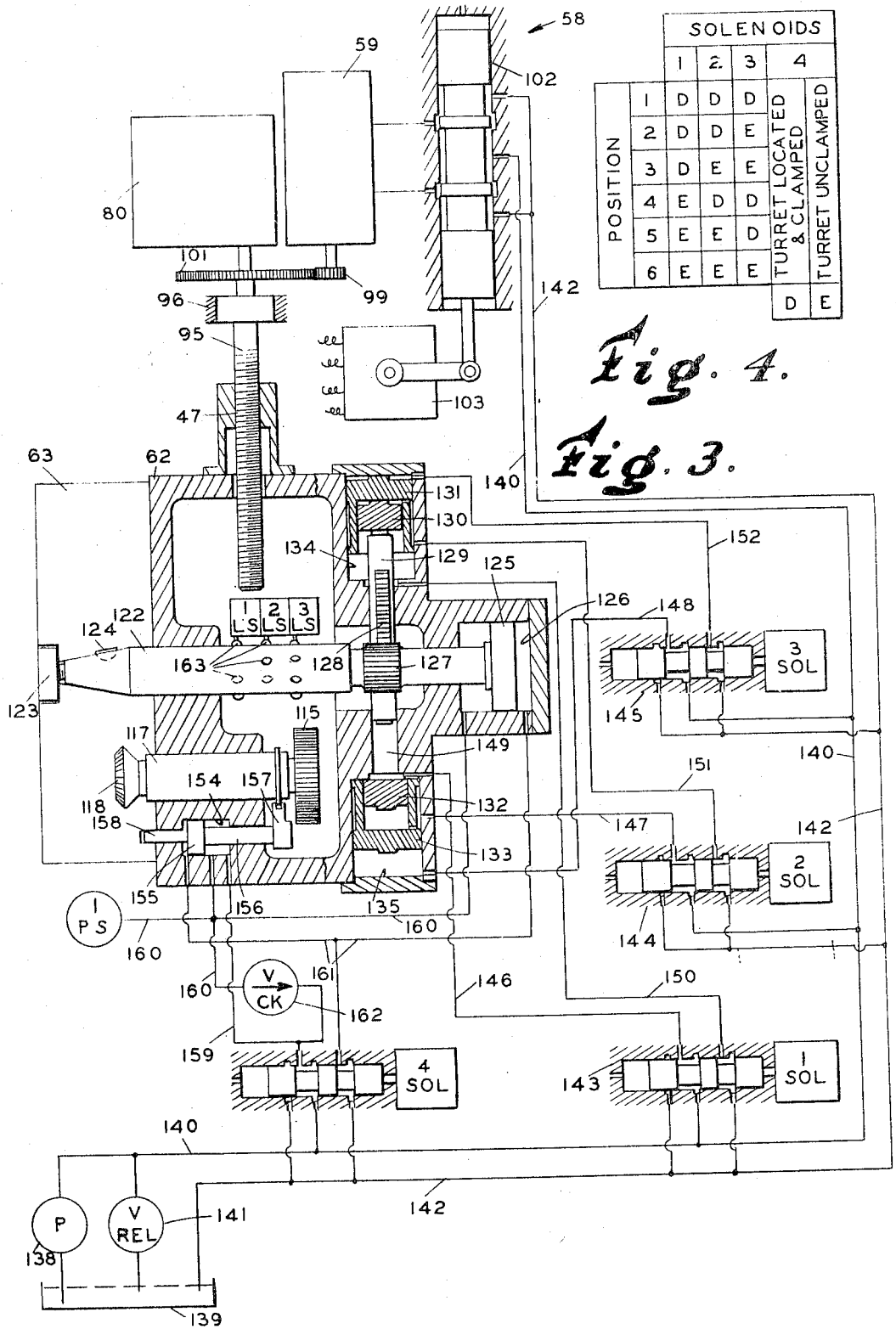

3,296,896
TURRET DRILLS
Herbert R. Uhtenwoldt, Worcester, Mass., assignor to Cincinnati Milling Machine Company, Cincinnati, Ohio, a corporation of Ohio
Original application Sept. 6, 1960, Ser. No. 57,100, now Patent No. 3,173,315, dated Mar. 16, 1965. Divided and this application Oct. 9, 1964, Ser. No. 402,735
6 Claims. (Cl. 77—25)

This application is a division of co-pending application Serial No. 57,100 filed September 6, 1964, for Turret Drill, and now Patent No. 3,173,315, granted March 16, 1955.

This invention relates to an automatic turret drill and, more particularly, to a numerically controlled turret drill which will automatically perform various machining operations on a workpiece more quickly and efficiently than has heretofore been possible with known types of indexable turret drilling machines.

In a preferred embodiment of the invention, the machine is adapted to be controlled from a tape containing information as to the tool to be selected, the type of operation to be performed such as tapping or drilling, the X and Y coordinates of hole location, the depth of the hole being machined, and the spindle speeds and feeds to be employed as described in Patent No. 3,173,315. The machine is provided with a vertically movable drill head on which the turret is rotatably mounted. A plurality of radially extending tool spindles are provided on the turret for holding drills, taps, reamers, and similar tools, each of which may be selectively brought into operative position by indexing the turret about its support on the drill head. The rotary positioning of the turret is effected by a hydraulic motor which is movable to a plurality of predetermined positions. After the turret is positioned, it is located and clamped by a hydraulically operated shot plunger and clamp piston.

Accordingly, it is an object of the present invention to provide a new and improved form of turret positioning, locating and clamping mechanism for machine tools of the type in which any one of a plurality of rotary tools mounted on an indexable turret may be selected for operation.

With these and other objects in view, which will become apparent from the following description, the invention includes certain novel features of construction and combinations of parts, the essential elements of which are set forth in the appended claims, a preferred form or embodiment of which will hereinafter be described with reference to the drawings which accompany and form a part of this specification.

In the drawings:

FIG. 3 is a diagrammatic view of the drill head and turret and includes the hydraulic circuit utilized to operate the same.

FIG. 4 is a chart showing the turret positions corresponding to the energization of the control solenoids.

Figure 1:
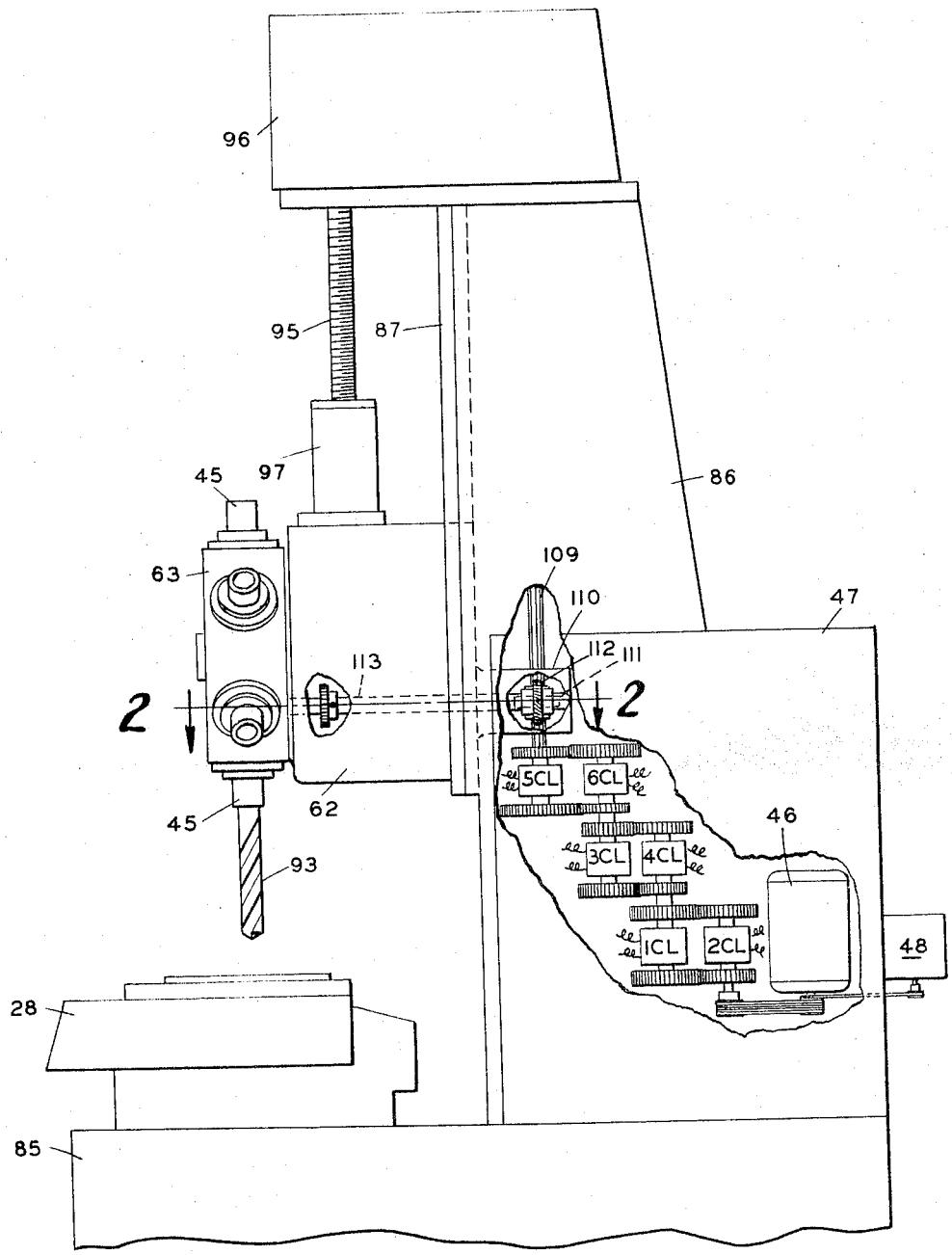
FIG. 1 is a side elevation of a turret drill to which the present invention is shown applied.
Figure 2:
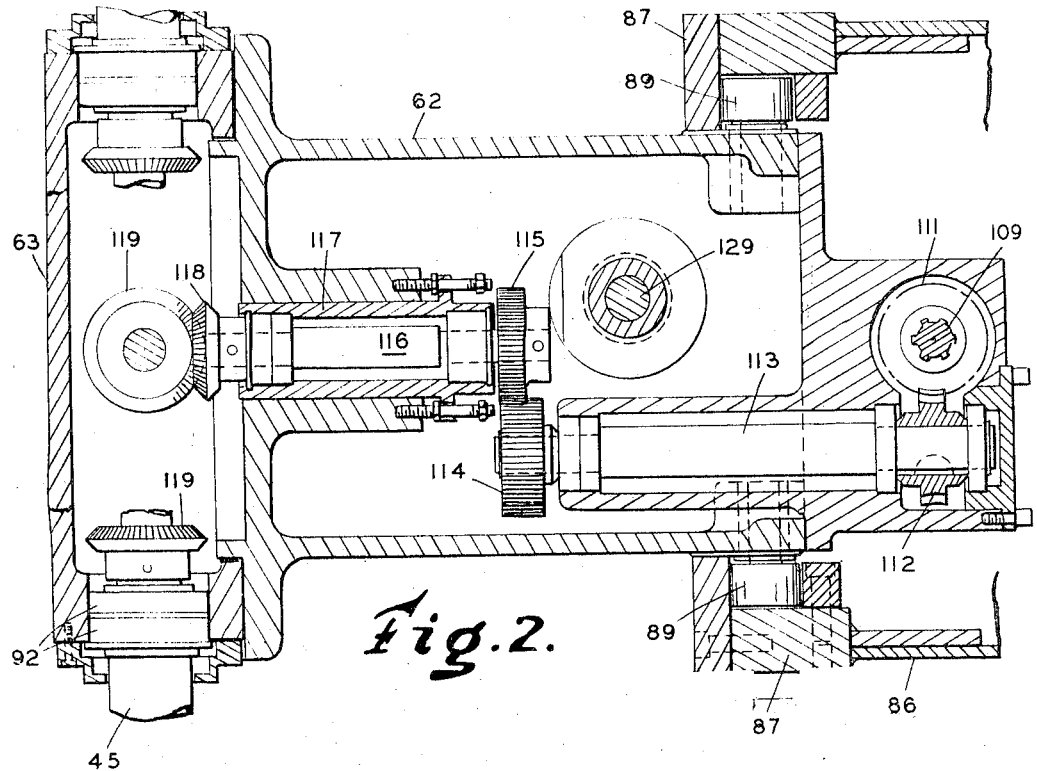
FIG. 2 is a cross-sectional view taken along the line 2—2 in FIG. 1.

The turret drill shown in FIGS. 1 to 4, inclusive, has a frame comprised of a base 85 (FIG. 1) on which is supported a column 86. The forward face of the column is provided with a pair of vertically extending ways 87 (see also FIG. 2) on which the drill head 62 is supported by rolls 89 for movement in a vertical direction. The drill head carries the turret 63 which is supported on the head for rotation about a horizontal axis. In the present embodiment of the invention, the turret is fitted with six radially extending spindles 45. The spindles are journaled in bearings 92 (FIG. 2) fitted in apertures in the turret, and each is adapted to hold a drill 93 or other suitable tool therein. Located beneath the turret 90 on the base 85 is the table 28 which is adapted to support the piece of work being machined. In the present embodiment, this table is adjusted in two mutually perpendicular directions in a horizontal plane as indicated in FIG. 5. These directions are hereinafter referred to as the X-axis and Y-axis, while the vertical adjustment of the head is referred to as the Z-axis. The head is arranged to be moved along the ways 87 by a feed screw 95 which is supported for rotation only in a housing 96 secured to the upper end of the column 86. The screw meshes with a nut 97 secured to the drill head so that when the screw is rotated, the head will be moved up or down along the ways. Rotation of the screw is effected by the hydraulic motor 59 (FIG. 3) driving a pinion 99 which meshes with a gear 101 secured to the upper end of the screw. The motor is controlled by the servovalve 58 consisting of a piston type valve 102 and an electric torque motor 103 for operating the valve. The motor and valve are situated within the housing 96 as is also the feedback unit 80 which is drivingly connected to the upper end of the screw 95.

The drive for the spindle 45 is provided by motor 46 which drives a splined shaft 109 journaled in the column 86 through electromagnetic clutches 1CL to 6CL. These clutches may, for example, be of the "MDO" type manufactured and sold by Warner Electric Brake & Clutch Co., of Beloit, Wisconsin. These are single acting, multiple disc clutches in which a stationary field coil, when energized, causes a set of outer discs keyed to a driving cup to be pressed into engagement with a set of inner discs, keyed to a driven cone thereby coupling the cup to the cone. When the field coil is deenergized, a return spring separates the disc and disengages the cup from the cone. By virtue of the different gear ratios employed in the drive train, it is possible, by energizing the clutches in various combinations, to obtain a considerable range of spindle speeds. Additionally, as will be explained later, the motor 46 is wired to operate at two different speeds so that a high range of spindle speeds may be obtained and also a low range. The motor 46 also has a direct driving connection to the tachometer 48 which provides an A.C. output that is utilized in a manner to be more fully explained hereinafter.

The drill head has secured thereto a gear casing 110 within which is situated a helical gear 111 slidable along the splined shaft 109 while being rotated therewith. The gear 111 meshes with a companion gear 112 in the casing 110, which latter gear is fastened to a shaft 113 journaled in the head. At its forward end, the shaft has fixed thereto a gear 114 (FIG. 2) which meshes with a gear 115 attached to the rear end of a shaft 116 journaled in a sleeve 117 which is slidable in the head. The forward end of this shaft projects into the turret where it is fitted with a bevel gear 118. Inside of the turret each spindle 45 has secured thereto a bevel gear 119 with which the gear 118 is adapted to mesh when the spindle is brought into operative position.

The turret is arranged to be indexed from any position to any other position under the control of solenoid operated valves as shown in FIG. 3. It will be noted that the turret is provided with a tapered socket which receives the tapered end of a shaft 122 which is journaled in the drill head 62. The turret is drawn snugly onto the end of the shaft by a nut 123 and is held against rotation thereon by a key 124. At its rear end the shaft is fitted with a clamping piston 125 which works in a cylinder 126 attached to the frame of the drill head. The shaft also has secured thereto an elongated pinion 127 which meshes with a rack 128 carried by a plunger 129 which forms part of the hydraulic motor 70 for indexing the turret. Cooperating with each end of the plunger are operating pistons 130, 131, 132 and 133, which are received in cylinders 134 and 135. The pistons 131 and 133 are bored to provide cylinders into which the smaller pistons 130 and 132 are fitted.

Pressure for operating the pistons is provided by a pump 138 which draws fluid from a reservoir 139 and supplies it to a pump line 140 at a pressure determined by the setting of a relief valve 141. Exhaust fluid from the motor and other parts of the system is returned to the reservoir through a line 142. The flow of pressure fluid from the line 140 to the indexing pistons is controlled by valves 143, 144 and 145 which are operated by solenoids 1SOL, 2SOL, and 3SOL, respectively. In FIG. 3, the valves are shown in the positions they occupy when the solenoids are deenergized. When the solenoids are energized, the valves are moved toward the left as viewed in this figure. The chart in FIG. 4 indicates which solenoids must be energized (E) and which must be deenergized (D) for each position of the turret. When all three solenoids are deenergized as shown in FIG. 3, the turret is moved to bring the #1 spindle 45 and its associated tool into operative position as, for example, the drill 93 shown in FIG. 1. With the valves 143, 144 and 145 in the positions shown, fluid under pressure will be supplied to motor lines 146, 147 and 148. Pressure in line 148 will move the large piston 133 up until it bottoms against the upper end of cylinder 135. This will, of course, carry the smaller piston 132 along with it. Pressure in the line 147 will flow into an elongated annular groove formed in the piston 133 and thence through a port in the piston into the interior thereof. Thus, fluid will enter the cylinder in which piston 132 is fitted and will move this piston up until it too bottoms on the end of the cylinder 135. Pressure supplied through line 146 to a cylinder 149 in which the plunger 129 works will force the plunger upward to the position shown. It will be observed that when pressure is connected to motor lines 146, 147 and 148, the other group of motor lines 150, 151, and 152 will be connected to reservoir through line 142. Hence, the upper pistons 130 and 131 will collapse under the upward thrust of the plunger 129. This is the first position of the turret.

When solenoid 3SOL is energized, pressure in line 152 will force piston 131 down in the cylinder 134, and piston 133 will be released and permitted to move down to the bottom of cylinder 135. This is the second position of the turret in which spindle #2 is moved into operative position. When solenoid 2SOL is also energized, pressure in line 151 will force the piston 130 down, and piston 132 will be released and permitted to move down in piston 133. This is the third position of the turret, in which spindle #3 is moved into operative position. When solenoid 1SOL is energized, and solenoids 2SOL and 3SOL are deenergized, pressure in cylinder 149 will be released, and pressure will be applied to the upper end of the plunger. This will force the bottom end of the plunger against the piston 132 which will be held in the position shown in FIG. 3 by the pressure in lines 147 and 148. This is the fourth position of the turret in which spindle #4 is moved into operative position. When solenoids 1SOL and 2SOL are energized, and solenoid 3SOL is deenergized, pressure will be applied to the upper end of plunger 129 and to the piston 130 through lines 150 and 151. Also, piston 132 will be released while piston 130 will be forced down. Pistons 131 and 133 will assume the positions shown in FIG. 3, which is the fifth position of the turret with spindle #5 moved into operative position. When all three solenoids are energized, pressure in lines 150, 151 and 152 will apply pressure to pistons 130 and 131 and to the top of plunger 129. This will cause pistons 132 and 133 to collapse, and the plunger will assume its lowermost position, which is just the reverse of the position shown in FIG. 3. This is the sixth position of the turret in which spindle #6 is moved into operative position.

Before the turret can be indexed, it must be unclamped and the bevel gear 118 withdrawn from engagement with the gear 119 on the spindle. The engagement and disengagement of the bevel gears is effected by a piston 155 which works in a cylinder 154 in the drill head. The piston is attached to a piston rod 156 which carries a shifting fork 157 for moving the sleeve 117 and gear 118 back and forth in the head. The piston also operates a locating pin 158 which seats in a recess formed in the turret to insure proper alignment of the turret in each position to which it is moved.

When solenoid 4SOL is deenergized, as shown in FIG. 3, pressure from line 140 is communicated by a line 159 to the rear of the piston 155. This maintains the bevel gear and locating pin in their forward positions. Pressure from the cylinder 154 is also communicated by an intermediate port therein to a line 160 which is connected to a pressure switch 1PS and also to the forward face of the clamping piston 125. This will draw the shaft 122 rearwardly and clamp the turret against the drill head. When solenoid 4SOL is energized, pressure from line 140 will be delivered through a line 161 to the rear face of piston 125 to unclamp the turret and the forward end of cylinder 154 to disengage the bevel gear and locating pin. Pressure will also be cut off from line 160, and the latter will be connected through a check valve 162 to the reservoir line 142. This will release pressure from the pressure switch 1PS for a purpose which will be fully explained hereinafter.

In order to verify correct positioning of the turret 90 in accordance with information supplied from the tape, the shaft 122 on which the turret is mounted is provided with a group of protuberances 163. These protuberances are adapted to operate limit switches 1LS, 2LS, and 3LS situated within the head 62 as shown in FIG. 3. By utilizing different combinations of protuberances 163 in each of the six positions of the turret, it is possible to determine from the condition of the limit switches whether the turret is in the position called for by the tape. More will be said about this feature of the control system in connection with the relay circuits which will hereinafter be described.

While in the foregoing description the invention was explained in connection with one possible form or embodiment thereof wherefore certain specific terms and language have been used herein, it is to be understood that the present disclosure is illustrative rather than restrictive and that changes and modifications may be resorted to without departing from the spirit of the invention as defined by the claims which follow.

What is claimed is:

1. A locating and clamping mechanism for a tool turret movable to a plurality of index positions comprising a frame, a shaft supported for rotary and axial movement in said frame, a turret fixed on said shaft for movement therewith, said turret having a locating recess therein for each index position, a piston motor connected to said shaft for effecting axial movement thereof to clamp and unclamp the turret, a hydraulically operated plunger mounted in said frame for axial movement into and out of engagement with the locating recesses in said turret, a valve for controlling the operation of said plunger, and a hydraulic circuit controlled by portions on said plunger as it moves into engagement with a locating recess in said turret for energizing said piston motor and clamping said turret.

2. The locating and clamping mechanism of claim 1 including a tool spindle in said turret, a driven gear on said spindle, a drive gear supported on said frame for sliding movement into and out of engagement with said driven gear, and means operated by said plunger as it moves into engagement with a locating recess in said turret for moving said drive gear into engagement with said driven gear whereby a driving connection will be provided to the tool spindle when the turret is located and clamped.

3. A machine tool having a frame, a work support carried by said frame, a tool support mounted on said frame for movement relative to said work support, a turret mounted on said tool support for rotation about a central axis, a plurality of tool spindles journaled in said turret for rotation about axes spaced about and diverging from said central axis, a spindle drive mechanism including a drive gear carried by said frame and a driven gear on each of said spindles adapted to mesh with said drive gear when its associated spindle is moved into operative position, and means for indexing said turret about its axis to a plurality of operative positions each of which coincides with an operative position of one of said tool spindles, said indexing means including a reciprocatory motor movable to a plurality of predetermined positions for rotating said turret directly from one operative position to any other operative position, and selectively operable means for controlling the rotation of said turret by said motor so as to move a selected one of the tool spindles into operative position.

4. The machine tool of claim 3 wherein said motor is a linear hydraulic motor having an output member movable directly from one of a plurality of predetermined positions to any other of said plurality of predetermined positions, and including means for drivingly connecting said output member to said turret.

5. The machine tool of claim 4 wherein said last-mentioned means includes a rack on said output member and a pinion connected to said turret and meshing with said rack.

6. The machine tool of claim 5 including means for moving said turret and said pinion relative to said tool support and said rack in the direction of said central axis so as to disengage said drive and driven gears without disturbing the meshing relationship of said rack and pinion prior to indexing of said turret by said motor.

References Cited by the Examiner
UNITED STATES PATENTS 2,952,169  9/1960  Johnson ---------- 74—826 XR FRANCIS S. HUSAR, *Primary Examiner.*